TESTING APPARATUS FOR RADIO COMMUNICATION SYSTEMS
Filed June 30, 1950
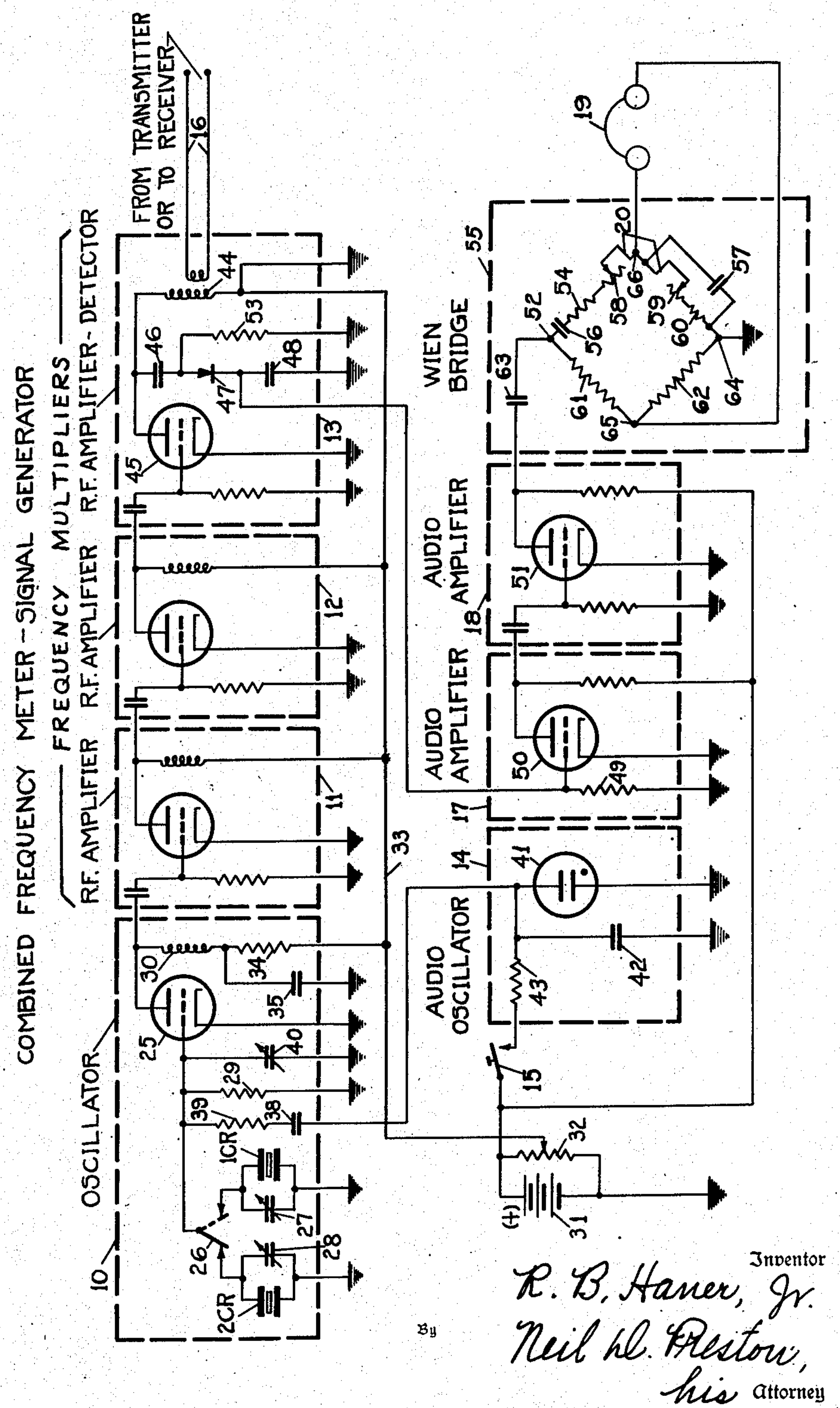
Inventor
R. B. Haner, Jr.
By Neil W. Preston,
his Attorney Patented Nov. 11, 1952 2,617,938

UNITED STATES PATENT OFFICE 2,617,938

TESTING APPARATUS FOR RADIO COMMUNICATION SYSTEMS

Robert B. Haner, Jr., Scottsville, N. Y., assignor to General Railway Signal Company, Rochester, N. Y.

Application June 30, 1950, Serial No. 171,514

2 Claims. (Cl. 250—39)

This invention relates to communications apparatus and more particularly pertains to a device useable both as a frequency meter and as a signal generator.

In the maintenance of radio communications equipment, means must be provided to generate a signal, selectively modulated or unmodulated, from a local, controllable source as an aid in maintaining proper operation of radio receivers and other communications devices. Such a signal source is particularly useful, for example, in the alignment of a communications receiver. To provide, in a portable unit, the accuracy and frequency stability ordinarily found in cumbersome laboratory equipment, crystal frequency control is considered desirable. Hence, the device of the present invention is especially applicable for use with communications equipment operating on a number of fixed frequencies. By providing in the test device the proper crystal for each frequency of operation of the communications apparatus and including switching means for selectively connecting any one of said crystals in a suitable oscillator, a stable and accurate output frequency may be obtained.

Also, in the operation and maintenance of radio communications apparatus, means must be provided for setting and checking the operating frequency of a transmitter to ensure its operating on the proper designated frequency. Accordingly, an object of the present invention is to provide a test instrument incorporating the functions of both frequency meter and signal generator into a single portable unit, thus permitting substantial economy in the use of various parts such as piezoelectric crystals used for frequency control.

For use as a frequency meter, a crystal-controlled signal generator of the kind described is particularly suitable when the operating frequency of some device such as a transmitter is to be set exactly to an available output frequency of the signal generator. Thus, the beat note obtained by mixing the known signal generator frequency with the unknown frequency may be amplified and then the unknown frequency varied until the beat note frequency reduces to zero. At that setting, the unknown frequency exactly equals the output frequency of the transmitter. At times it is, however, desirable to determine the frequency of a signal, as from a transmitter, even when the unknown frequency differs from any of the frequencies attainable with the crystal-controlled signal generator. Therefore, an object of this invention is to provide, in combination with a crystal-controlled signal generator, a frequency meter for determining the frequency of an unknown signal which frequency differs from some particular crystal-controlled standard frequency produced by the signal generator portion of the test instrument.

Other objects, purposes, and characteristic features of the present invention will be in part obvious from the accompanying drawing and in part pointed out as the description of the invention progresses. In describing the invention in detail, reference will be made to the accompanying drawing illustrating a specific embodiment of this invention.

The parts and circuit of this invention are shown diagrammatically and conventional illustration are used to simplify the drawing and the explanation. The drawing has been made to make it easy to understand the principles and manner of operation rather than to show the specific construction and arrangement of parts that would be used in practice. A battery has been shown to represent a source of direct current, but in practice such direct current may, if desired, be obtained by the rectification of alternating current.

The general organization of the device of this invention includes, as shown by the embodiment thereof illustrated in the accompanying drawing, a crystal-controlled oscillator 10 having its output amplified by the amplifiers 11, 12, and 13. A saw-tooth oscillator 14 may be selectively energized by closure of switch contact 15 thereby supplying an audio voltage to the control grid of the electron tube included in oscillator 10. Injection of this audio voltage onto the control grid of oscillator tube 25 produces both amplitude and frequency modulation in the oscillator output. The various amplifiers following oscillator 10 are so operated that they remove substantially all of the undesired amplitude modulation; therefore, when switch contact 15 is closed, the output of amplifier 13 is a frequency-modulated radio-frequency signal and, when switch contact 15 is open, an unmodulated radio-frequency signal. The output of amplifier 13 is then inductively coupled to wires 16 which may be the conductors of a coaxial cable and is thus directly applied to the input of a receiver or other apparatus.

When the frequency of some signal such as the output frequency of a transmitter is to be adjusted to equal some particular output frequency of the test instrument, a signal voltage at the unknown frequency is applied to conductors 16 and inductively coupled into the plate circuit of amplifier 13. This signal of unknown frequency then combines with the output signal of amplifier 13 as obtained from oscillator 10. This combining of currents of different frequencies produces a resultant current having amplitude variations occurring at a rate equal to the difference in frequency between the two combining currents. By rectifying the resultant current in the plate circuit of tube 45 included in amplifier 13, this beat or difference frequency is obtained and is applied to the input circuit of audio amplifier 17. The output of amplifier 17 is further amplified by audio amplifier 18, the output of which then appears between terminal 52 and ground of an alternating-current bridge circuit 55. When the unknown frequency is exactly equal to that of the standard frequency, no beat note is applied to the input of amplifier 17 and, with no voltage applied between terminal 52 and ground of the bridge circuit, no audible output can be heard in the receivers 19.

Government regulations require that the actual operating frequency of a transmitter be periodically determined and recorded. With the test instrument of this invention, the actual transmitter frequency may readily be determined provided that the difference between the unknown transmitter frequency and a known signal generator frequency is an audible frequency. To determine the unknown transmitter frequency, a signal from the transmitter is applied over wires 16 and coupled into the plate circuit of amplifier detector 13. The difference frequency resulting from beating the unknown frequency with the known signal generator frequency is amplified by audio amplifiers 17 and 18 and applied across terminals 52 and ground of bridge circuit 55. By proper adjustment of dual potentiometer 20 an aural null of the beat note may be determined, and, with proper calibration of the setting of potentiometer 20, the difference frequency may be ascertained. Means are also provided to determine whether the unknown frequency is above or below the known frequency so that the actual unknown frequency can then be fully determined.

The specific embodiment of the invention shown in the accompanying drawing includes the oscillator 10 comprising an electron discharge tube 25. As shown, a selector switch 26 connects either piezoelectric crystal 1CR with its associated shunting capacitor 27 or crystal 2CR with its associated condenser 28 between the control grid of tube 25 and ground. Although selection is thus provided between only two crystals, corresponding to two different frequencies to appear in the signal generator output, additional crystals with their associated shunting capacitors can be provided if desired so that any one of numerous frequencies can be generated.

The cathode of tube 25 is connected directly to ground and the control grid is connected through its grid leak resistor 29 to ground. The plate-cathode circuit of tube 25 includes a variable inductance 30 which may be considered to be shunted by its distributed capacitance to form a parallel tuned circuit. A direct-current power source is represented by battery 31 which is shunted by potentiometer 32 so that the voltage on bus 33 may be varied as required. A decoupling resistor 34 and condenser 35 are provided in the plate-cathode circuit of tube 25 to prevent interfering voltages on the bus 33 from affecting the oscillator frequency. The circuit organization thus provided is a form of the well known tuned grid-tuned plate oscillator having its frequency of oscillation determined by the frequency of a mode of vibration of the particular crystal included in the grid-cathode circuit. Other types of oscillator circuits could, of course, be used instead.

The variable capacitor shunting each crystal included in the grid-cathode circuit is for the purpose of permitting the oscillator frequency to be adjusted over a relatively small range of variation to some particular value, thereby permitting calibration of the output frequencies to some fixed standard. The small variable capacitor 40 connected between the control grid and ground of tube 25 similarly permits varying the oscillator frequency over a small range regardless of which crystal is, at any moment, being used. Ordinarily, however, this variable capacitor 40 is set at some intermediate value and the oscillator frequency is then calibrated by varying the magnitude of the capacitance shunting each crystal to produce the desired output frequency. The reason for providing variability of the oscillator frequency by means of this condenser 40 will presently be explained.

The embodiment of this invention shown in the accompanying drawing is preferably for use with communications devices operating at relatively high frequencies as of the order of 150 megacycles per second. It should be understood, of course, that the principles of this invention apply as well to a testing instrument adapted to be used at lower frequencies. Since improved operating characteristics of the oscillator 10 may be obtained when this oscillator 10 operates at a relatively low frequency, the amplifiers following this oscillator must not only amplify but also multiply the oscillator frequency to the desired value. In this particular embodiment, the oscillator operates at a frequency of approximately 4 megacycles per second and a frequency multiplication factor of 36 produced by the following amplifiers gives the required frequency multiplication. To produce this frequency multiplication, the radio frequency amplifier 11 can be operated as a frequency quadrupler with the following amplifiers 12 and 13 each acting as frequency triplers. Any other suitable frequency multiplication arrangement could also, of course, be used.

The amplifiers 11, 12, and 13 are operated as class C amplifiers. Thus, the grid leak bias provided by the flow of grid current during a portion of the input driving cycle through the grid leak resistor associated with each amplifier tube produces the required bias voltage which is approximately twice the cutoff voltage for such tube. Each grid leak resistor may be considered to be shunted by the capacitance provided in a path from the control grid, through the coupling condenser, plate load inductance of the previous stage and through the power supply to ground. This capacitance shunting each grid leak resistor ensures that the required class C bias is steadily maintained for each amplifier tube even during that portion of each input voltage cycle when no grid current flows through the associated grid leak resistor. With class C operation, the plate output of each tube contains numerous harmonics in addition to the fundamental corresponding to the frequency of the input voltage. Consequently, by tuning the plate tank circuit of each of these amplifiers to the desired harmonic the plate tank circuit acts as a high impedance only to the desired harmonic so that substantially only the desired harmonic voltage appears across the plate tank circuit.

The output amplitude of this test instrument may be varied by varying the plate voltage applied to the various RF amplifiers and the oscillator. As is well known in the art, variation of the direct voltage applied to the plate electrode of a class C amplifier provides a ready means of varying the output of such an amplifier. By this means, the desired magnitude of output may be obtained.

When a modulated output signal is required, switch contact 15 is closed, thereby energizing the audio oscillator 14. This oscillator is of the conventional saw-tooth type employing a neon tube 41. This tube 41 and the associated resistor 43 and condenser 42 are so chosen that the fundamental frequency of the oscillator output falls well within the audio range. Of course, a saw-tooth output waveform as provided by an oscillator of this kind contains numerous harmonics, but the presence of these harmonics presents no disadvantage since the requirement is only that an audio voltage be applied between the control grid and cathode of oscillator tube 25. The output of th audio oscillator 14 is applied through condenser 38 and resistor 39 to the control grid of tube 25. Condenser 38 is a blocking condenser to prevent the direct voltages of the audio oscillator from being applied to the oscillator tube 25 control grid. Since this condenser 38 must be of a relatively large value to present a low impedance to the audio voltage, resistor 39 is included in series with the condenser 38 to prevent a reduction of the input impedance to tube 25.

The application of an audio voltage between control grid and cathode of tube 25 produces both amplitude and frequency modulation of the oscillator output. A possible theory of operation explaining the appearance of frequency modulation in the oscillation in the oscillator output is that the audio variation of the grid-cathode voltage of tube 25 varies the amplification factor of this tube at an audio rate and, according to the familiar Miller effect, this variation of the amplification factor produces the effect of a varying capacitance between control grid and ground, thereby varying the oscillator frequency at this same audio rate.

In addition to producing the desired frequency modulation, application of the audio voltage to the grid, tube 25 also produces amplitude modulation. However, class C amplifiers such as the RF amplifiers 11, 12, and 13, when operated with a grid driving voltage of sufficient amplitude to drive their grids positive during a portion of each cycle of grid driving voltage, effectively limit variations of amplitude in their input. In other words, the plate current saturation limiting on each positive half cycle of grid voltage caused by the flow of grid current accompanied by the cut-off limiting occurring during each negative half cycle of each grid driving voltage causes each of these class C amplifiers to act as an amplitude limiter. Thus, when the oscillator output is modulated by the audio voltage provided by audio oscillator 14, the amplifiers 11, 12, and 13 remove substantially all of the amplitude variation so that the output as applied to the conductors 16 includes approximately only frequency modulation.

When the device of this invention is to be used as a frequency meter to adjust the operating frequency of a transmitter, for example, to some particular value, a signal from the transmitter at the unknown frequency is fed over the conductors 16 and inductively coupled to the plate load inductance 44 of tube 45 included in the amplifier-detector 13. The proper crystal is connected in the grid-cathode circuit of tube 25 to provide the output frequency of amplifier-detector 13 to which the transmitter frequency is to be adjusted. The two radio frequency signals combine in the plate-cathode circuit of tube 45 to produce a resultant voltage having an envelope varying at a rate equal to the difference in frequency between the known signal generator frequency and the unknown transmitter frequency. The resultant voltage appearing across inductance 44 also appears across condenser 46, crystal detector 47, and condenser 48. Condenser 46 by-passes the radio-frequency currents which are then rectified by the crystal detector 47. Resistor 53 provides a current path to ground for the discharge of condenser 46. The radio-frequency components of the rectified current are by-passed to ground by condenser 48 so that there appears at the junction of condenser 48 and crystal detector 47 an audio voltage corresponding in frequency to the difference frequency between the unknown transmitter frequency and the known signal generator frequency. Condenser 48 is shunted by the grid leak resistor 49 of tube 50 included in the audio amplifier 17 to provide the required time constant for the discharge of condenser 48.

The resultant beat frequency signal is amplified by audio amplifiers 17 and 18 comprising the tubes 50 and 51 respectively. The amplified beat frequency is then applied between terminal 52 and ground of the output bridge circuit 55. The particular form of alternating-current bridge circuit shown in the accompanying drawing is that commonly known as a Wien or frequency bridge. One arm of the bridge includes a condenser 56 in series with a fixed resistor 54 and a variable resistor 58. An adjacent arm of the bridge includes a condenser 57 in parallel with a fixed resistor 60 and variable resistor 59. Resistor 54 and 60 are preferably of an equal value of resistance, and condenser 57 is chosen to have preferably twice the capacitance of condenser 56. Resistors 58 and 59 are also preferably equal and included in a dual potentiometer 20 so that as the setting of the potentiometer is varied, the amount of resistance in these respective arms of the bridge remains at a constant ratio. The remaining arms of the bridge include only resistors as indicated by resistors 61 and 62 having values such as are required to balance the bridge.

As already mentioned, the bridge circuit 55 is shown connected in such a manner that the plate of tube 51 is connected through blocking condenser 63 to bridge terminal 52, with bridge terminal 64 connected to ground. The operation of this bridge circuit would be the same, however, if any other two opposite terminals were connected to ground and through condenser 63 to the plate of tube 51 respectively. Thus, the plate of tube 51 could instead be connected through condenser 63 to terminal 65 with terminal 66 connected to ground.

When the frequency of the beat note applied between terminal 52 and ground of the bridge circuit 55 falls between certain limits, a setting of the potentiometer 20 may be found, corresponding to each beat frequency for which the bridge is balanced, i. e., the point at which no output is applied to the audio responsive device 19. The audio responsive device 19 may be a pair of headphones as diagrammatically illustrated in the drawing, or any other device for converting audio frequency electrical signals to sound can be used.

There are, consequently, two conditions by which an aural null may be obtained in the audio responsive means 19. One of these conditions occurs when the unknown and the signal generator frequency are exactly equal so that the beat frequency reduces to zero and no signal appears between terminal 52 and ground. The other condition is, as described, that occurring when the bridge is balanced so that any beat frequency signal applied to the bridge is substantially fully attenuated.

In general, the frequency for which the bridge circuit 55 is balanced varies inversely with the resistance included in those arms of the bridge which also include capacitance. Therefore, as the adjustable tap on the potentiometer 20 is moved so as to include more resistance in the respective arms of the bridge, the frequency for which balance is obtained is decreased. However, the maximum resistance that can be thus inserted is so selected that the balance frequency does not fall below a certain level as, for example, one kilocycle per second. As the unknown frequency is varied so that it more closely approaches the known signal generator frequency, the beat frequency decreases so that when the beating frequencies are nearly equal, the beat note has a very low frequency. Because the bridge cannot be balanced for these low audio frequencies, the dual potentiometer 20 may be set in any position without attenuating, to any substantial degree, the beat note heard in headphones 19 that results when the beating signals have nearly the same frequency. To determine that the desired null, occurring when the unknown frequency exactly matches the standard frequency, has been obtained, the unknown frequency may be varied to either side of the null setting. Only if a true null has been obtained, will the beat note heard in the headphones 19 rise in frequency to either side of the null setting, indicating thereby that the null is one at which the beat frequency has been reduced to zero frequency and is not caused by attenuation produced by balancing of the bridge.

When the test instrument is to be used to determine the actual frequency of some signal, the unknown signal is again applied to the conductors 16 and inductively coupled to the inductance 44. The beat frequency signal is then obtained as before by rectification of the resultant amplitude-varying signal. This beat frequency signal is amplified by audio amplifiers 17 and 18, and applied, as before, between terminal 52 and ground of the Wien bridge 55. Briefly, the frequency of this beat signal is determined by varying the setting of potentiometer 20 until no beat signal or a minimum beat signal is heard in the headphones 19. The settings of the dual potentiometer 20 are calibrated in terms of frequency because each setting of this potentiometer balances the bridge for a corresponding beat frequency. Additional means are also provided, as will be described for determining whether the unknown frequency is above or below the standard signal generator frequency. Thus, knowing the frequency by which the unknown frequency differs from the standard frequency and also knowing whether it is larger or smaller than the standard, the unknown frequency is fully determined.

In general, for the Wien bridge 55 to be balanced, two conditions must be fulfilled. The first of these conditions is that the ratio of the values of capacitors 57 to 56 must be equal to the ratio of the values of resistors 61 to 62 minus the ratio of the values of resistors 54 and 58 to that of resistors 59 and 60. Since resistors 54 and 60 are preferably chosen to be of equal value, and potentiometer 20 is so constructed that, as its setting is varied, the values of resistors 58 and 59 vary by the same amount, the sum of resistors 54 and 58 always substantially equals the sum of resistors 59 and 60. Thus, for the particular ratio of values of the components described, the above condition holds: the ratio of capacitance of condensers 57 to 56 (two) equals the ratio of the values of resistors 61 to 62 (three) minus the ratio of the values of resistors 54 and 58 to resistors 59 and 60 (one). Of course, it should be remembered that other ratios of these values may be used, the only requirement being that for correct balance of the bridge, the stated relationship between these ratios be obtained. Over the range of variation of the dual potentiometer 20, however, the ratio of amount of resistance included in the adjacent arms of the bridge may vary slightly so that a precise balance may not occur for all input frequencies. Therefore, the relationship of resistor 62 to resistor 61 is so chosen that a perfect balance is obtained at some selected beat frequency so that, as the beat frequency varies above and below this intermediate value, a very close balance of the bridge may be obtained.

The second condition for bridge balance is that the resistance included in either arm also including a condenser is inversely related to the input beat frequency. Therefore, as already explained, for some particular beat frequency applied to the opposite terminals of the bridge, a setting of the potentiometer 20 may be found that will produce balance of the bridge as indicated by the absence of an audible tone in the headphones 19. In this embodiment of the invention, the amount of resistance that can be included in series with condenser 56 and in parallel with condenser 57, respectively, is so adjusted that the balance of the bridge may be obtained only for those beat frequencies falling between 1 and 6 kilocycles per second. Thus, any unknown frequency differing by more than 1 kilocycle but less than 6 kilocycles from a frequency that may be obtained by the insertion of a proper crystal in the grid-cathode circuit of oscillator 10 may be measured by means of the bridge circuit 55. Other suitable frequency limits could also be chosen so that any frequency differing from an attainable signal generator frequency by a frequency falling within the audible range could be determined.

Although the bridge circuit thus provides a means for determining the difference in frequency between an unknown and a standard frequency, additional means must be provided to determine whether such unknown frequency is above or below the standard frequency because the beat frequency is dependent only upon the difference between the unknown and standard frequencies. For this reason, condenser 40 is included in the grid-cathode circuit of tube 25. As described, condenser 40 is ordinarily set at some intermediate value and the oscillator frequency is then calibrated for those conditions. To determine whether the unknown frequency is above or below the signal generator frequency, the signal generator frequency is varied in such a manner as to reduce the beat note frequency heard in the headphones 19. Incidentally, varying the signal generator frequency destroys the bridge balance so that an audible note is again produced in headphones 19. A reduction of the beat note frequency means that the signal generator frequency is varied in such a direction that it is brought closer to the frequency of the unknown signal. If to decrease the beat frequency, the capacitance of condenser 40 must be increased, thereby reducing the signal generator frequency, the frequency of the unknown signal must be below that of the signal generator. Conversely, if, to decrease the beat frequency, the capacitance provided by variable condenser 40 must be decreased thereby increasing the signal generator frequency, the unknown frequency must be above that of the signal generator frequency. Therefore, the control knob provided for varying condenser 40 may be marked in such a manner that the direction of change of the value of this condenser required to reduce the beat frequency immediately gives the information as to whether the unknown frequency is above or below the frequency of the standard.

A test instrument is thereby provided for use with communications apparatus which provides both modulated and unmodulated radio frequency signals as required. This same signal generator, by including an amplifier or audio frequencies permits the frequency of an external signal source to be set to equal an output frequency of the signal source. By including also a bridge circuit that may be balanced for beat frequencies, this test instrument also provides a ready means for determining unknown frequency values.

Having described a combined frequency meter and signal generator as one specific embodiment of the present invention, it should be understood that this form is selected to facilitate in the disclosure of the invention rather than to limit the number of forms which it may assume; and it is to be further understood that various modifications, adaptations, and alterations may be applied to the specific form shown to meet the requirements of practice without in any manner departing from the spirit or scope of this invention.

What I claim is:

1. A signal generator and frequency meter having apparatus in common and comprising, an oscillator operating at a selected frequency, circuit means for selectively frequency modulating said oscillator, amplifier and frequency multiplier means for increasing the amplitude and multiplying the frequency of the output provided by said oscillator to provide signal of known frequency, output coupling circuit means having the output of said amplifier means applied thereto to provide a useable output signal, means for applying a signal of unknown frequency to said coupling circuit means, detector and filter circuit means connected to said coupling means for providing a signal having a beat frequency corresponding to the difference in frequency between said signals of known and unknown frequency, a four terminal alternating-current bridge circuit comprising resistive and reactive circuit elements and having said beat frequency signals applied to opposite terminals thereof, electro-responsive circuit means connected across the remaining opposite terminals of said bridge circuit and responsive to the voltage across said remaining opposite terminals, whereby for any beat frequency the values of said bridge circuit elements may be selected to supply a minimum output to said electro-responsive circuit means with the values of said elements providing said minimum output determinating the value of said beat frequency.

2. A combined signal generator and frequency meter comprising a radio-frequency oscillator including an electron tube, a piezoelectric crystal connected in the grid circuit of said tube, a tuned circuit including capacitance and conductance connected in the plate circuit of said tube and resonant substantially to the frequency of oscillation of the plate current of said tube, a saw-toothed oscillator including a gas discharge tube for selectively supplying an audio voltage to the control grid of said electron tube to modulate the output of said tube, amplifier circuit means for increasing the amplitude of the output provided by said oscillator, output coupling circuit means having the output of said amplifier circuit means applied thereto for providing a useable output signal at a predetermined frequency, circuit means for applying a signal of unknown frequency to said coupling circuit means, detection for filtering circuit means connected to said coupling means for providing a signal having a beat frequency related to the difference in frequency between said unknown frequency and said predetermined frequency, a frequency-responsive bridge circuit including resistive and reactive circuit elements and having said beat frequency signal applied to opposite terminals thereof, electro-responsive circuit means connected across the remaining opposite terminals of said bridge circuit and responsive to the voltage across said remaining opposite terminals whereby for any beat frequency the values of said bridge circuit elements may be chosen to provide a minimum output to said electro-responsive circuit means with the values of said elements determining the magnitude of said beat frequency.

ROBERT B. HANER, Jr.

REFERENCES CITED

The following references are of record in the file of this patent:

UNITED STATES PATENTS

| Number | Name | Date |
|---|---|---|
| 1,611,224 | Nyquist | Dec. 21, 1926 |
| 1,944,315 | Clapp | Jan. 23, 1934 |
| 2,186,182 | Stocker et al. | Jan. 9, 1940 |
| 2,324,077 | Goodale et al. | July 13, 1943 |
| 2,393,717 | Speaker | Jan. 29, 1946 |
| 2,393,856 | Collins | Jan. 29, 1946 |

OTHER REFERENCES

General Radio Experimenter, February 1947, vol. XXI, No. 9, "A Versatile Monitor for Use From 1.6 to 150 Megacycles," pages 1 to 5.